United States Patent [19]

Höglund et al.

[11] Patent Number: 5,233,543
[45] Date of Patent: Aug. 3, 1993

[54] DEVICE FOR GENERATING A CURRENT CORRESPONDING TO A QUANTITY SUPPLIED TO THE DEVICE

[75] Inventors: Peter Höglund; Tommy Noaksson; Lars Strandberg, all of Västeraås, Sweden

[73] Assignee: Asea Brown Boveri AB, Västeraås, Sweden

[21] Appl. No.: 697,404

[22] Filed: May 9, 1991

[30] Foreign Application Priority Data

May 15, 1990 [SE] Sweden ............................ 9001745-0

[51] Int. Cl.$^5$ ...................... G06F 11/22; G05B 23/00
[52] U.S. Cl. ............................. 364/551.01; 364/184; 364/481; 395/575
[58] Field of Search ............... 364/186, 187, 184, 133, 364/481, 551.01; 395/575; 371/8.1, 9.1, 11.1

[56] References Cited

U.S. PATENT DOCUMENTS

| | | | |
|---|---|---|---|
| 3,593,307 | 7/1971 | Gouge, Jr. .......................... | 364/186 |
| 4,153,198 | 5/1979 | Eki et al. .......................... | 364/133 X |
| 4,347,563 | 8/1982 | Paredes et al. ................... | 364/133 X |
| 4,500,951 | 2/1985 | Sugimoto et al. ................. | 364/186 |
| 4,634,110 | 1/1987 | Julich et al. ..................... | 364/186 X |
| 4,654,846 | 3/1987 | Goodwin et al. ................. | 364/187 X |
| 4,835,671 | 5/1989 | Sato et al. ........................ | 364/186 |
| 5,021,938 | 6/1991 | Hayakawa ....................... | 364/187 X |
| 5,095,418 | 3/1992 | Arita et al. ....................... | 364/186 X |

FOREIGN PATENT DOCUMENTS

2422196 2/1979 France .
2448192 8/1980 France .

Primary Examiner—Kevin J. Teska
Attorney, Agent, or Firm—Watson, Cole, Grindle & Watson

[57] ABSTRACT

A method and apparatus for generating a current corresponding to a quantity supplied to the device, for example an analog current output device for a digitally working process control system, using two parallel-working current-generating means, each one connected to a current summation means; the current-generating means are each adapted to generate a current proportional to the quantity and the proportionality being determined by a changeable proportionality factor. Each one of the current-generating means being adapted to supervise both its own function and that of the other means. Upon indication of a malfunction in one of the means, the function of the device is taken over by the other means alone. Each one of the current-generating means may preferably be adapted, by means of switching means, to close an alternative circuit for the generated current for sensing whether an indicated malfunction in one of the current-generating means is caused by an internal fault in the current-generating means or by an external fault such as an interruption in the part of the circuit which is connected to the means, for the generated current.

17 Claims, 4 Drawing Sheets

DEVICE FOR GENERATING A CURRENT CORRESPONDING TO A QUANTITY SUPPLIED TO THE DEVICE

TECHNICAL FIELD

The present invention relates to a device for generating a current corresponding to a quantity supplied to the device, for example an analog current output device for a digitally working process control system. The device comprises redundant circuits and is designed to monitor and control the function thereof.

BACKGROUND ART

Actuators for influencing industrial processes are often designed such that their position is a function of a current fed into the actuator. Therefore, between a system for control of a process and the actuator of the process there are generally required members for conversion of the control signals, generated by the control system, into currents corresponding to these signals.

A fault in such a conversion member results in the capacity of the control system to control the process being reduced or lost, which may have serious economic consequences and which may also affect the safety. In those cases where the control functions are particularly critical, the conversion members are therefore often doubled, in which case normally only one of these members is connected to the actuator. When a malfunction is indicated in the connected conversion member, a switching is effected so that this member is disconnected and instead the other conversion member is connected. This switching is generally carried out with electromechanical relays, which, however, themselves contribute—to no negligible extent—to the rate of failure of those parts of the plants which are located between the control system and the actuator.

SUMMARY OF THE INVENTION

The invention aims to provide a device for generating a current corresponding to a quantity supplied to the device, which device, on the one hand, has a redundant function and, on the other hand, in case of an indicated malfunction, performs the switching aimed at between the redundant circuits by means of components with a low rate of failure.

According to the invention, the above is achieved by the device comprising two parallel-working current-generating members, each one being adapted to supervise both its own function and that of the other current-generating member. Upon indication of a malfunction in the current-generating member itself, the function of the device is taken over by the other current-generating member alone by means of passive components in a summation connection.

According to a further development of the invention, by connecting an alternative circuit for the generated current, arranged in each one of the current-generating members, the device can be designed to sense whether an indicated malfunction is caused by an internal fault in the current-generating member or by an external fault, such as an interruption in the external part of the circuit for the generated current, which part is connected to the current-generating member.

BRIEF DESCRIPTION OF THE DRAWINGS

The invention will be explained in greater detail by way of examples with reference to the accompanying drawings, wherein.

DESCRIPTION OF THE PREFERRED EMBODIMENTS

Figure 1:
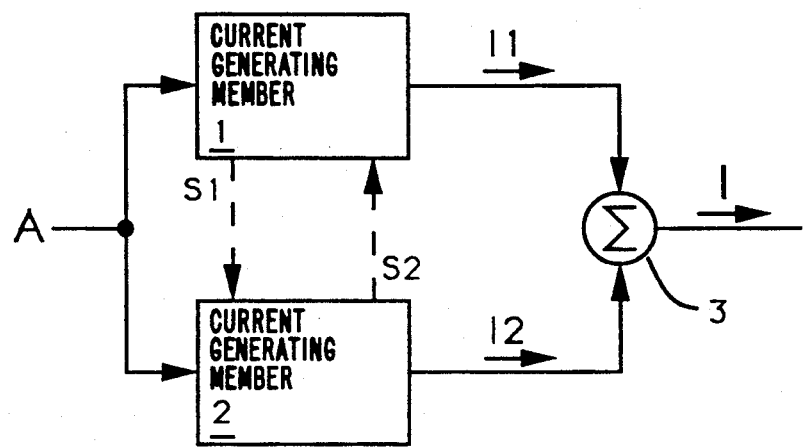
FIG. 1 shows a schematic view of the device.

FIG. 1 shows a first and a second current-generating member 1, 2, which from a superordinate member (not shown), for example a digitally or analogically working process control system, are supplied with a quantity A. Each one of the current-generating members 1, 2 is adapted to generate a current I1, I2 proportional to the quantity A.

I1 and I2 are determined by the relationships $$I1 = k1 \cdot A \quad (1)$$

$$I2 = k2 \cdot A \quad (2)$$

The currents I1 and I2 are summed up in a current summation member 3 to a total current I, for which thus the following relationship applies $$I = (k1 + k2) \cdot A \quad (3)$$

Furthermore, each one of the current-generating members 1, 2 is adapted, in case of faultless function, to form a status signal S1, S2, to sense the presence thereof and, as indicated in dashed lines in FIG. 1, to sense the presence of the status signal S2, S1 formed by the other current-generating member 2, 1. Further, each one of the current-generating members 1, 2 is adapted, dependent on the presence of the status signals S1, S2, to influence in accordance with predetermined criteria the proportionality between the supplied quantity A and the generated current I1, I2. These criteria are formed in accordance with the principle shown in FIG. 2a, relating to the current-generating member 1, and FIG. 2b, relating to the current-generating member 2. When the status signals S1, S2 are both present, the proportionality factors k1 and k2, defined in equations 1 and 2, assume predetermined values k1=k11 and k2=k21. If a status signal S1, S2 is absent, the proportionality factor k1, k2 assumes the value zero and, if the other status signal S2, S1 is present, the proportionality factor k2, k1, belonging to the other current-generating member 2, 1, assumes a value equal to the sum of the two predetermined values k11 and k21. It is clear from this that if both or at least one of the two current-generating members 1, 2 have a faultless function, equation 3 will be as follows $$I = (k11 + k21) \cdot A \quad (4)$$

and, thus, that the proportionality between the quantity A and the total current I generated by the device remains unchanged for as long as at least one of the current-generating members 1, 2 has a faultless function.

Figure 3:
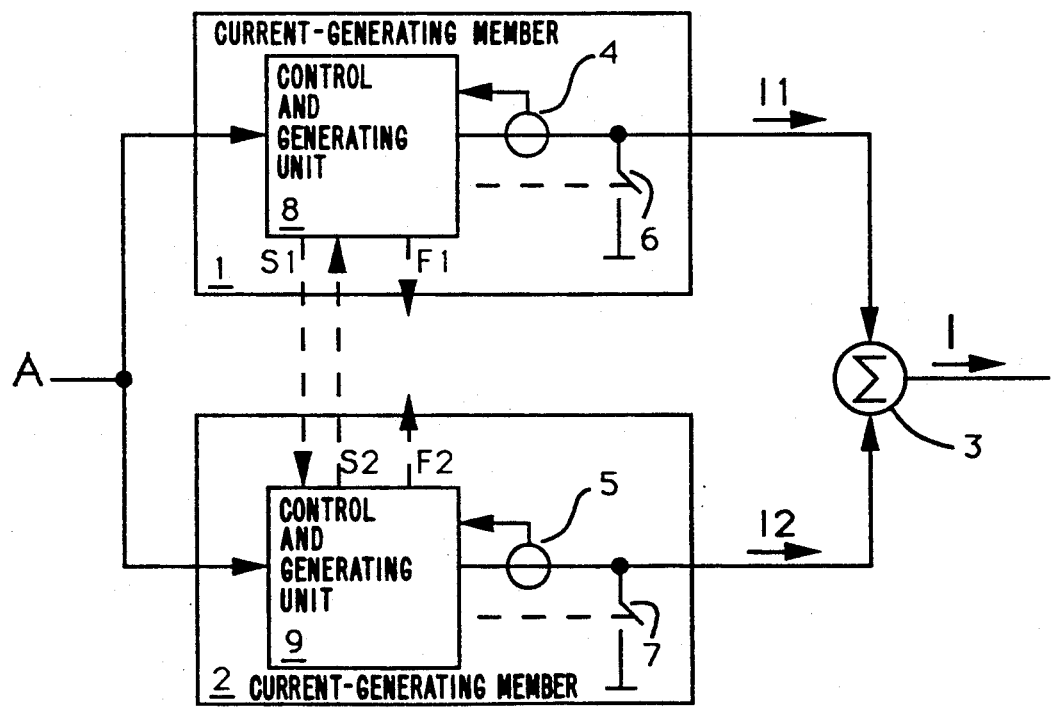
FIG. 3 shows schematically a further development of the device.

FIG. 3 shows a current measuring member 4, 5 included in each one of the current-generating members 1, 2 and adapted to measure the generated current I1, I2, as well as a switching member 6, 7, also included in each one of the current-generating members 1, 2 and adapted, through the influence of the current-generating member 1, 2, to close within this member an alternative circuit for the generated current I1, I2. Further, each one of the current-generating members 1, 2 comprises a unit 8, 9 adapted to form a reference value IC1, IC2 representing the product of A and the proportionality factor k1, k2, to generate the current I1, I2, to form an actual value IR1, IR2 representing the value of the generated current I1, I2 measured with the current measuring member 4, 5, to form a difference D1, D2 between the reference value IC1, IC2 and the actual value IR1, IR2, and, dependent on the reference value IC1, IC2, the actual value IR1, IR2 and the difference D1, D2, to form according to predetermined criteria the status signal S1, S2 and, in the case of a fault such as an interruption in the external circuit for the generated current I1, I2, connected to the current-generating members 1, 2, to form a fault signal F1, F2.

Figure 4A:
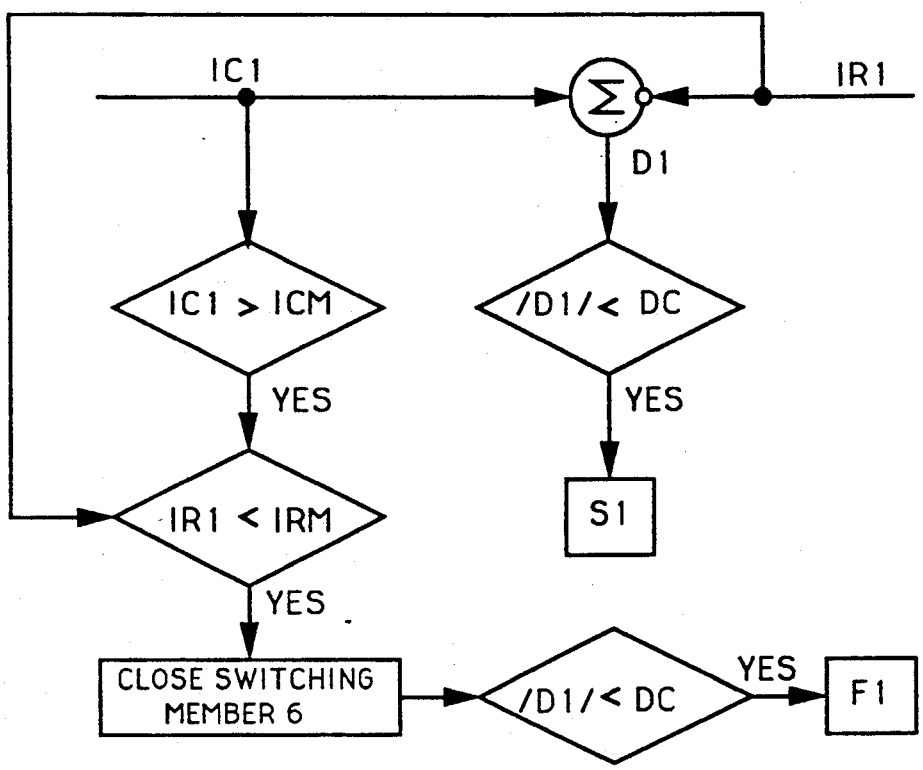
FIGS. 4a and 4b show in the form of flow charts criteria for forming status and fault signals.
Figure 4B:
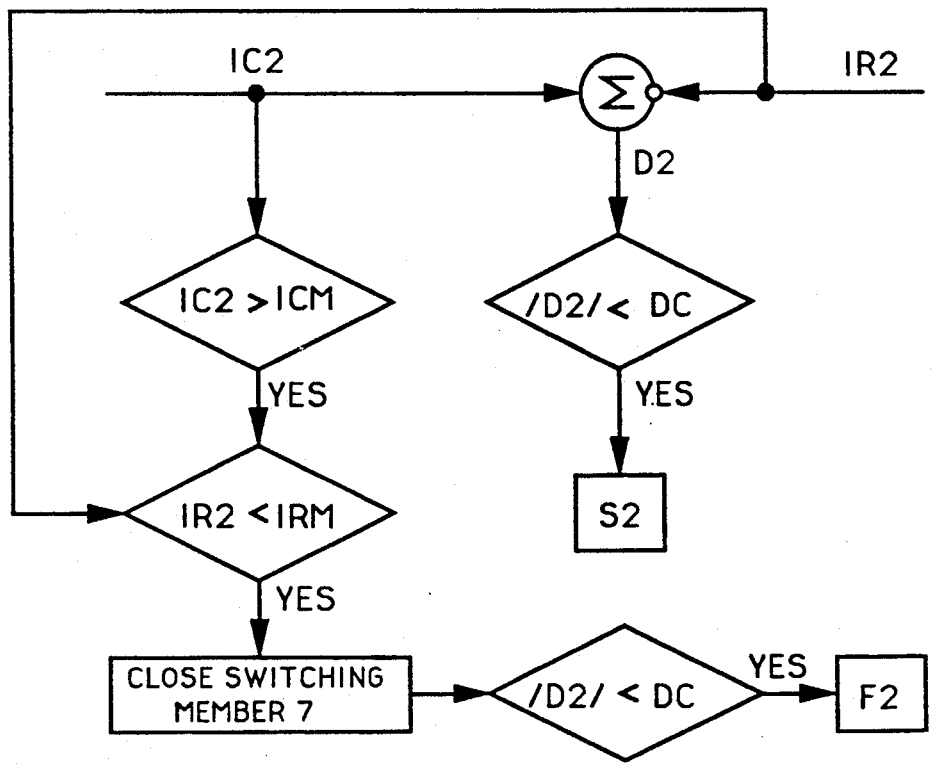

The above criteria are formed in accordance with the principle shown in FIG. 4a, referring to the current-generating member 1, and FIG. 4b, referring to the current-generating member 2. The absolute value of the difference D1, D2 is compared with a first check value DC and if the mentioned absolute value is smaller than the first check value DC, the status signal S1, S2 is formed. Further, the reference value IC1, IC2 is compared with a second check value ICM and the actual value IR1, IR2 with a third check value IRM. To be able to determine, with a high degree of certainty, whether an external fault is present, it is suitable to choose the mentioned check values so that the second check value ICM corresponds to a current I1, I2 greater than that current I1, I2 to which the third check value IRM corresponds and so that the first check value DC is smaller than the difference between the second check value ICM and the third check value IRM. If the reference value IC1, IC2 is greater than the second check value ICM and at the same time the actual value IR1, IR2 is smaller than the third check value IRM, the switching member 6, 7 is caused to close the alterative circuit for the generated current I1, I2 and thereafter to compare the absolute value of the difference D1, D2 with the first check value DC. Now, if the mentioned absolute value is smaller than the first check value DC, the fault signal F1, F2 is formed to be sensed from a surrounding device, for example a process control system.

Figure 5:
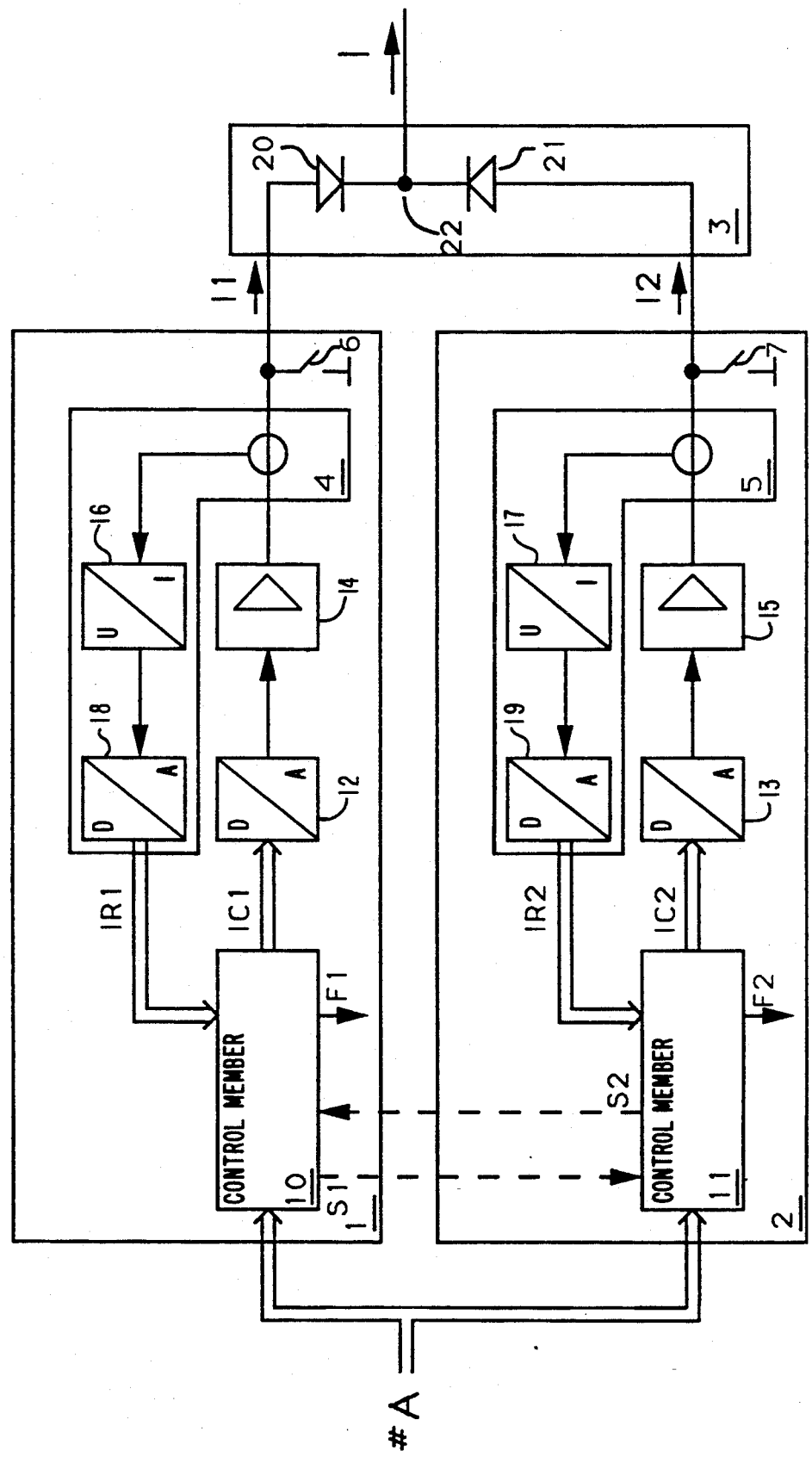
FIG. 5 shows in the form of a block diagram an embodiment of the invention.

FIG. 5 shows a control member 10, a digital-to-analog convertor 12 and a current-amplifying member 14, which are arranged in the current-generating member 1, as well as a control member 11, a digital-to-analog convertor 13 and a current-amplifying member 15, which are arranged in the current-generating member 2. Each one of the current-measuring members 4, 5 comprises a current/voltage converting member 16, 17 and an analog-to-digital convertor 18, 19. The current summation member 3 consists of two diodes 20, 21, each one with one of its poles connected to a common point of connection 22.

FIG. 5 shows in double lines the transmission of quantities in digital code, in single lines the transmission of analog voltages or currents. The transmission of status and fault signals is indicated in dashed lines.

Figure 2B:
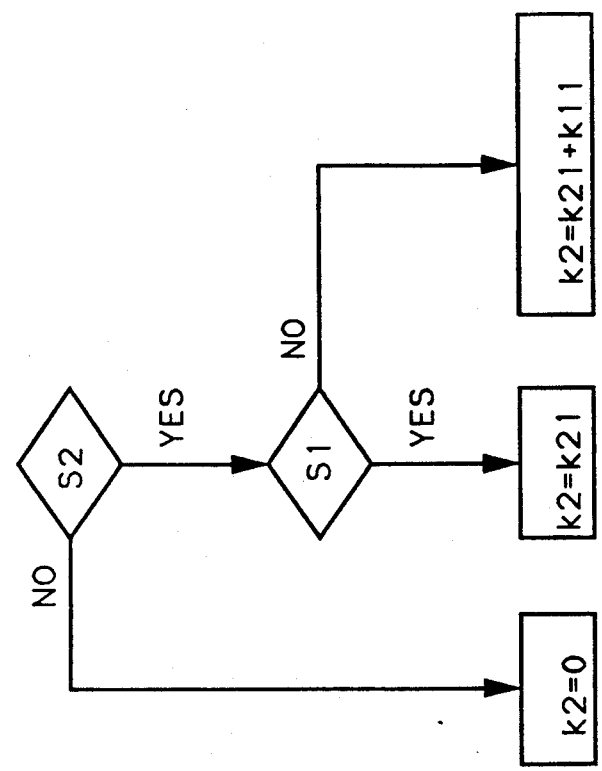
FIGS. 2a and 2b show in the form of flow charts the criteria for the redundant function of the device.
Figure 2A:
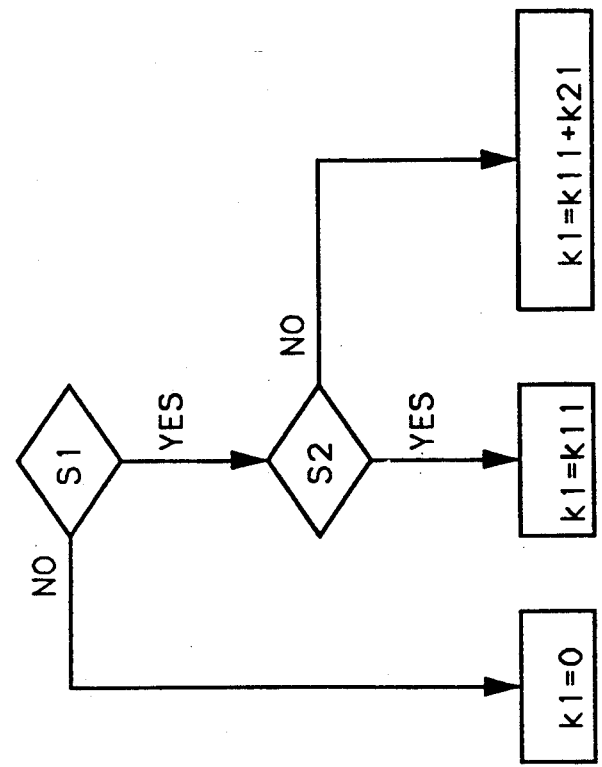

The control members 10, 11 consist of a microprocessor, which via an interface unit (not shown) senses the quantity A in digital form. The microprocessors are each programmed in accordance with the principles shown in previously described flow charts as illustrated in FIGS. 2a, 2b and in FIGS. 4a, 4b. The current/voltage converting member 16, 17 consists of a shunt which is traversed by the generated current I1, I2.

The invention is not limited to the embodiment shown but several modifications are feasible. Thus, the control members 10, 11 may consist of hard-wired circuits, provided for this purpose, and the formation and the sensing of the status signals S1, S2 and the formation of the fault signals F1, F2 may take place at recurrent intervals as well as continuously. The current-generating members 1, 2 may be provided with indicating devices indicating the presence of status and fault signals and be adapted to make these signals available to be sensed from surrounding devices. If it is found to be suitable, each one of the current-amplifying members 14, 15 may be integrated with the digital-to-analog convertor 12, 13 connected to the member. Especially when the units 8, 9 and the control members 10, 11, respectively, operate in digital mode, a simple solution is obtained if the predetermined values k11, k21 of the proportionality factors k1, k2 are chosen to be equal, but they may, of course, also be chosen to be unequal. The device may be designed such that the two diodes 20, 21 are located within the respective current-generating members 1, 2 whereas the point of connection 22 is located outside thereof. This makes it possible to use the current-generating members 1, 2 either in a redundant connection, in which case they are connected two-by-two to the connection point 22, or, in those cases where there are no demands for redundancy, to connect each one of them to a respective external circuit. In the latter case, they may also be designed, by utilization of the current measuring member 4, 5, to form a quantity A corresponding to current I1, I2 supplied to the current-generating member 1, 2 and thus be utilized as analog current input devices for, for example, a process control system.

We claim:

1. A device for generating an output current corresponding to a quantity supplied to the device, comprising:

first and second current-generating means, each generating a current proportional to said quantity, the proportionality factor being determined by a changeable proportionality factor, and each current-generating means comprising status signal forming means for forming a status signal indicating a faultless function of the current-generating means, and status signal-sensing means for sensing the presence of said status signal and the presence of the status signal formed in the other current-generating means, each of said status signal-sensing means generating output signals setting said proportionality factor of the current-generating means associated with the relevant status signal-sensing means to zero for the case that said status signal is not present, to a predetermined value different from zero for the case that said status signal and the status signal formed in the other current-generating means are both present, and to a value equal to the sum of the predetermined values of the proportionality factors of said current-generating means for the case that said status signal is present and the status signal formed in the other current-generating means is not present;

current summation means connected to receive the currents generated by of said first and second current-generating means;

each current-generating means comprises a current measuring means for measuring the current generated by itself and each of said status signal forming means comprises comparing means for forming the product of the quantity and the proportionality factor of the current-generating means in which said status signal forming means is comprised, for forming the difference between a reference value, representing said product, and an actual value representing the value of the current measured with the current measuring means, and for comparing the absolute value of said difference with a first check value; and each of said status signal-forming means sensing the absolute value of said difference and forming said status signal for the case that said absolute value is smaller than said first check value.

2. A device according to claim 1, wherein said current summation means consists of two diodes, each one conducting one of the currents generated by said current-generating means to a common point of connection.

3. A device according to claim 1, wherein said currents generated by said current-generating means are equal when said status signals are both present.

4. A device according to claim 1, wherein each of said current-generating means further comprises a control means for sensing said quantity, a digital-to-analog converter and a current-amplifying means, the input of said current-amplifying means is connected to the output of said signal forming means and said status signal sensing means of the current-generating means associated with the relevant control means, and reference forming means for forming said reference value and making said reference value available to said digital-to-analog converter.

5. A device according to claim 4, wherein each of said current measuring means comprises a current/voltage converting means, and an analog-to-digital converter, the output of said analog-to-digital converter is connected to the control means.

6. A device according to claim 1, wherein each of said current-generating means further comprises a switching means for closing an alternative circuit for the current generated by itself and fault signal forming means for sensing said reference value, for generating an output signal causing said switching means to close said alternative circuit if said reference value is greater than a second check value and at the same time said actual value is smaller than a third check value, and for forming a fault signal if the absolute value and said difference then is smaller than said first check value.

7. A device according to claim 6, wherein each of said current-generating means further comprises a control means for sensing said quantity, a digital-to-analog converter and a current-amplifying means, the input of said current-amplifying means is connected to the output of said signal forming means and said status signal sensing means of the current-generating means associated with the relevant control means, and reference forming means for forming said reference value and making said reference value available to said digital-to-analog converter.

8. A device according to claim 7, wherein each of said control means comprises the fault signal means associated with the current-generating means in which the control means is comprised.

9. A device according to claim 7, wherein each of said current measuring means comprises a current/voltage converting means, and an analog-to-digital converter, the output of said analog-to-digital converter is connected to the control means.

10. A method for generating an output current corresponding to a quantity, comprising the steps of:

generating a first current, proportional to the quantity by a first changeable proportionality factor, and a second current, proportional to the quantity by a second changeable proportionality factor;

measuring for each of said first and second currents the actual value thereof;

forming a difference between each of said actual values and a reference value, representing the product of said quantity and the one of said proportionality factors which is associated with the one of the first or second currents whose actual value is used in forming said difference;

comparing the absolute value of said difference with a first check value;

forming a status signal indicating a faultless generation of the relevant one of said first or second current the actual value of which is used for forming said difference, for the case that said absolute value is smaller than said first check value;

sensing the presence of said status signal and the presence of the status formed in association with the generation of the other of said first or second currents;

setting said proportionality factor to zero for the case that said status signal is not present, to a predetermined value different from zero for the case that said status signal and the status signal formed in association with the generation of the other of said first or second current are both present, and to a value equal to the sum of the predetermined values of said first and second proportionality factors for the case that said status signal is present and the status signal formed in association with the generation of the other of said first or second currents is not present; and summing said first and second currents to said output current.

11. A method according to claim 10, further comprising the steps of:

summing said first and second current to said current by conducting each of them through a separate diode to a common point of connection from which said output current is conducted to an external circuit.

12. A method according to claim 10, further comprising the steps of:

generating said first and second currents to be equal to each other when said status signals are both present.

13. A method according to claim 10, wherein said quantity is available in digital form and further comprising the steps of:

sensing said quantity and forming said reference value in digital form;

converting said reference value in digital form to an analog signal; and amplifying said analog signal to a current proportional to said analog signal, thereby generating the relevant of said first or second currents.

14. A method according to claim 13, further comprising the steps of:

converting said actual value of said first or second current to a digital value proportional to said actual value; and comparing said digital value with said reference value in digital form.

15. A method according to claim 10, further comprising the steps of:

comparing said reference value with a second check value and said actual value with a third check value;

closing an alternative circuit for said first or second current for the case that said reference value is greater than said second check value and at the same time said actual value is smaller than said third check value;

comparing said difference with said first check value; and forming a fault signal if the absolute value of said difference is smaller than said first check value.

16. A method according to claim 15, wherein said quantity is available in digital form and further comprising the steps of:

sensing said quantity and forming said reference value in digital form;

converting said reference value in digital form to an analog signal; and amplifying said analog signal to a current proportional to said analog signal, thereby generating the relevant of said first or second currents.

17. A method according to claim 15, further comprising the steps of:

converting said actual value of said first or second current to a digital value proportional to said actual value; and comparing said digital value with said reference value in digital form.

* * * * *